US009631083B2

(12) United States Patent
Miyazawa et al.

(10) Patent No.: US 9,631,083 B2
(45) Date of Patent: Apr. 25, 2017

(54) RESIN COMPOSITION AND MOLDED PRODUCT THEREOF

(71) Applicant: ZEON CORPORATION, Tokyo (JP)

(72) Inventors: Shinsuke Miyazawa, Tokyo (JP); Shintaro Ikeda, Tokyo (JP)

(73) Assignee: ZEON CORPORATION, Tokyo (JP)

(*) Notice: Subject to any disclaimer, the term of this patent is extended or adjusted under 35 U.S.C. 154(b) by 0 days.

(21) Appl. No.: 14/767,535

(22) PCT Filed: Jan. 29, 2014

(86) PCT No.: PCT/JP2014/051933
§ 371 (c)(1),
(2) Date: Aug. 12, 2015

(87) PCT Pub. No.: WO2014/125921
PCT Pub. Date: Aug. 21, 2014

(65) Prior Publication Data
US 2016/0032094 A1    Feb. 4, 2016

(30) Foreign Application Priority Data

Feb. 12, 2013  (JP) ................................. 2013-023981

(51) Int. Cl.
| | | |
|---|---|---|
| B60C 1/00 | (2006.01) | |
| C08L 45/00 | (2006.01) | |
| C08K 7/14 | (2006.01) | |
| C08L 65/00 | (2006.01) | |

(52) U.S. Cl.
CPC ............... C08L 45/00 (2013.01); C08K 7/14 (2013.01); *C08G 2261/3324* (2013.01); *C08G 2261/3325* (2013.01); *C08G 2261/418* (2013.01); *C08G 2261/724* (2013.01); *C08L 65/00* (2013.01); *C08L 2203/20* (2013.01); *C08L 2205/025* (2013.01)

(58) Field of Classification Search
CPC . C08L 45/00; C08L 2203/20; C08L 2205/025
USPC ........................................................ 524/526
See application file for complete search history.

(56) References Cited

U.S. PATENT DOCUMENTS

| | | | |
|---|---|---|---|
| 5,194,534 A | 3/1993 | Bell | |
| 6,472,082 B2 * | 10/2002 | Kodemura | C08F 8/00 428/457 |

FOREIGN PATENT DOCUMENTS

| | | |
|---|---|---|
| CA | 2 110 611 A1 | 6/1994 |
| EP | 0 439 650 A1 | 8/1991 |
| EP | 0936231 A1 | 8/1999 |
| JP | S5239752 A | 3/1977 |
| JP | S58-1738 A | 1/1983 |
| JP | S58-145750 A | 8/1983 |
| JP | H05-345817 A | 12/1993 |
| JP | H08-20692 A | 1/1996 |
| JP | 09118811 A * | 5/1997 |
| JP | H09-118811 A | 5/1997 |
| JP | H10-152534 A | 6/1998 |
| JP | 2000-048895 A | 2/2000 |
| JP | 2002-363370 A | 12/2002 |
| JP | 2002363370 A * | 12/2002 |
| JP | 2006-052333 A | 2/2006 |
| JP | 2013-010309 A | 1/2013 |
| JP | 2013-256596 A | 12/2013 |
| WO | 02/098974 A1 | 12/2002 |
| WO | 2012/033076 A1 | 3/2012 |

OTHER PUBLICATIONS

Apr. 28, 2014 Search Report issued in International Patent Application No. PCT/JP2014/051933.
Apr. 28, 2014 Written Opinion of the International Searching Authority issued in International Patent Application No. PCT/JP2014/051933.
Jul. 28, 2016 extended European Search Report issued in European Application No. 14751138.0.

* cited by examiner

*Primary Examiner* — Hui Chin
(74) *Attorney, Agent, or Firm* — Oliff PLC

(57) ABSTRACT

A resin composition including a resin component and glass fibers, the resin component including 0 to 99 wt % of a hydrogenated crystalline cycloolefin ring-opening polymer that includes a repeating unit derived from a polycyclic norbornene-based monomer that includes 3 or more rings, and does not include a polar group, and 1 to 100 wt % of a hydrogenated modified crystalline cycloolefin ring-opening polymer that includes a repeating unit derived from a polycyclic norbornene-based monomer that includes 3 or more rings, and includes a polar group, the resin composition including the glass fibers in an amount of 5 to 150 parts by weight based on 100 parts by weight of the resin component; and a resin formed article obtained by forming the resin composition.

13 Claims, No Drawings

RESIN COMPOSITION AND MOLDED PRODUCT THEREOF

TECHNICAL FIELD

The present invention relates to a resin composition that may suitably be used to produce an electronic part (e.g., antenna or connector) that exhibits excellent mechanical properties, excellent electrical properties, and excellent heat resistance, and a formed article (molded article) that is obtained by forming the resin composition.

BACKGROUND ART

It has been well-known to add glass fibers to a thermoplastic resin in order to reinforce a formed article produced by forming the thermoplastic resin. In particular, it has been known to use glass fibers that have been surface-treated using an organosilane compound or the like when preparing a composition that includes a polyolefin and glass fibers in order to improve the dispersibility of the glass fibers in the polyolefin as well as the affinity of the glass fibers to the polyolefin. A sufficient improvement in strength cannot be achieved when glass fibers are added to crystalline polypropylene. Patent Document 1 proposes using a modified polypropylene instead of crystalline polypropylene in order to achieve a sufficient improvement in strength, the modified polypropylene being obtained by modifying a crystallinity ethylene-propylene block polymer using an organosilane compound (that includes an ethylenically unsaturated bond) and an organic peroxide. Patent Document 2 proposes a modified polyolefin as a modifier when adding glass fibers to a polyolefin, the modified polyolefin being obtained by melt-mixing polypropylene, an unsaturated carboxylic acid, and an organic peroxide, and heating the mixture.

Patent Document 3 discloses that a high-frequency connector insulating member that exhibits excellent high-frequency electrical properties and excellent formability while preventing a situation in which cracks occur in a resin part can be obtained by utilizing a resin composition prepared by adding a filler and a soft polymer to an alicyclic structure-containing polymer resin (e.g., norbornene-based resin). Patent Document 4 discloses that a thermoplastic norbornene-based resin composition in which a filler and a resin matrix exhibit good adhesion can be obtained by utilizing an unsaturated carboxylic acid-modified elastomer as a soft polymer.

Patent Document 5 discloses that an insulating material that exhibits excellent oxidation resistance and excellent heat resistance while maintaining high heat resistance, low hygroscopicity, and electrical insulating properties can be obtained by utilizing a cycloolefin-based resin that includes a carboxylic acid derivative residue. Patent Document 6 discloses that electrical properties (e.g., dielectric constant) and copper foil peel strength are improved, and an additive can be uniformly dispersed when a modified norbornene-based polymer is used as a circuit board resin material, the modified norbornene-based polymer being obtained by subjecting an aromatic ring-containing norbornene-based polymer to graft modification using an unsaturated epoxy compound, an unsaturated carboxylic acid compound, or the like.

An alicyclic structure-containing polymer obtained by polymerizing a norbornene-based monomer is an amorphous resin that does not have a melting point when produced using a normal method. It has been known that a crystalline resin having a melting point can be obtained by subjecting dicyclopentadiene to ring-opening polymerization using a specific catalyst, and hydrogenating the carbon-carbon double bond included in the resulting ring-opening polymer. Patent Document 7 discloses that a hydrogenated crystalline dicyclopentadiene ring-opening polymer can produce a film that exhibits excellent heat resistance and flatness, and can be used in various fields.

RELATED-ART DOCUMENT

Patent Document

Patent Document 1: JP-A-58-145750
Patent Document 2: JP-A-58-001738
Patent Document 3: JP-A-2000-048895
Patent Document 4: JP-A-9-118811
Patent Document 5: JP-A-8-020692
Patent Document 6: JP-A-10-152534
Patent Document 7: JP-A-2013-010309

SUMMARY OF THE INVENTION

Technical Problem

An object of the invention is to provide a resin composition that may suitably be used to produce an electronic part (e.g., antenna or connector) that exhibits excellent mechanical properties, excellent electrical properties, and excellent heat resistance.

Solution to Problem

The inventors of the invention prepared a resin composition that includes an alicyclic structure-containing polymer and a filler (see Patent Documents 3 and 4) using the crystalline resin disclosed in Patent Document 7 as the alicyclic structure-containing polymer, and found that a formed article obtained by forming the resin composition exhibits a low dielectric loss tangent and excellent heat resistance, but exhibits insufficient bending strength (i.e., inferior mechanical properties).

The inventors conducted extensive studies in view of the above finding. As a result, the inventors found that an improvement in mechanical properties can be achieved by utilizing the crystalline resin disclosed in Patent Document 7 in combination with a modified resin that is obtained by subjecting the crystalline resin to graft modification using maleic anhydride or trimethoxysilane. This finding has led to the completion of the invention.

According to one aspect of the invention, a resin composition includes a resin component and glass fibers, the resin component including 0 to 99 wt % of a hydrogenated crystalline cycloolefin ring-opening polymer that includes a repeating unit derived from a polycyclic norbornene-based monomer that includes three or more rings, and does not include a polar group (hereinafter may be referred to as "hydrogenated crystalline cycloolefin ring-opening polymer" or "hydrogenated cycloolefin ring-opening polymer"), and 1 to 100 wt % of a hydrogenated modified crystalline cycloolefin ring-opening polymer that includes a repeating unit derived from a polycyclic norbornene-based monomer that includes three or more rings, and includes a polar group (hereinafter may be referred to as "hydrogenated modified crystalline cycloolefin ring-opening polymer" or "modified polymer"), the resin composition including the glass fibers in an amount of 5 to 150 parts by weight based on 100 parts by weight of the resin component.

The hydrogenated modified crystalline cycloolefin ring-opening polymer that includes a repeating unit derived from a polycyclic norbornene-based monomer that includes three or more rings, and includes a polar group, may be a polymer produced by subjecting a hydrogenated crystalline cycloolefin ring-opening polymer that includes a repeating unit derived from a polycyclic norbornene-based monomer that includes three or more rings, and does not include a polar group, to graft modification using an unsaturated carboxylic acid or a silicone derivative.

The hydrogenated crystalline cycloolefin ring-opening polymer that includes a repeating unit derived from a polycyclic norbornene-based monomer that includes three or more rings, and does not include a polar group, may have syndiotacticity.

According to another aspect of the invention, a resin formed article is obtained by forming the resin composition.

The resin formed article may be an electronic part.

The electronic part may suitably be used as an antenna, a connector, and the like.

DESCRIPTION OF EMBODIMENTS

A resin composition and a formed article according to exemplary embodiments of the invention are described in detail below.

1) Resin Composition

A resin composition according to one embodiment of the invention includes a resin component that includes 0 to 99 wt % (preferably 0 to 95 wt %) of the hydrogenated crystalline cycloolefin ring-opening polymer and 1 to 100 wt % (preferably 5 to 100 wt %) of the hydrogenated modified crystalline cycloolefin ring-opening polymer. The maximum mechanical strength is obtained when the ratio of the hydrogenated modified crystalline cycloolefin ring-opening polymer is 3 to 20 parts by weight. The mechanical properties tend to decrease gradually as the ratio of the hydrogenated modified crystalline cycloolefin ring-opening polymer increases. The mechanical properties obtained when the ratio of the hydrogenated modified crystalline cycloolefin ring-opening polymer is 100 wt % are better by a factor equal to or more than about 20% than those obtained when the hydrogenated modified crystalline cycloolefin ring-opening polymer is not used (i.e., when the ratio of the hydrogenated crystalline cycloolefin ring-opening polymer is 100 wt %).

The resin composition according to one embodiment of the invention includes glass fibers (hereinafter may be referred to as "glass filler") in an amount of 5 to 150 parts by weight, preferably 10 to 100 parts by weight, and more preferably 30 to 90 parts by weight, based on 100 parts by weight of the resin component.

Hydrogenated Crystalline Cycloolefin Ring-Opening Polymer

The hydrogenated crystalline cycloolefin ring-opening polymer used in connection with one embodiment of the invention is obtained by subjecting a monomer that includes at least a polycyclic norbornene-based monomer that includes three or more rings (hereinafter may be referred to as "polycyclic norbornene-based monomer") to ring-opening polymerization, and hydrogenating the main-chain double bond of the resulting ring-opening polymer, and exhibits crystallinity.

The hydrogenated crystalline cycloolefin ring-opening polymer may be produced using an arbitrary method. For example, the hydrogenated crystalline cycloolefin ring-opening polymer may be produced using the method disclosed in JP-A-2006-52333. The method disclosed in JP-A-2006-52333 subjects a norbornene-based monomer that includes three or more rings to solution polymerization using a Group 6 transition metal compound as a polymerization catalyst to obtain a cycloolefin ring-opening polymer that has syndiotacticity, and hydrogenating the main-chain double bond of the ring-opening polymer to efficiently produce the desired hydrogenated crystalline cycloolefin ring-opening polymer.

The crystalline cycloolefin ring-opening polymer used in connection with one embodiment of the invention may be produced using at least a polycyclic norbornene-based monomer that includes three or more rings as a monomer.

The term "polycyclic norbornene-based monomer that includes three or more rings" used herein refers to a norbornene-based compound that includes a norbornene skeleton and one or more cyclic structures that are fused with the norbornene skeleton in the molecule. Specifically, the polycyclic norbornene-based monomer that includes three or more rings refers to a norbornene-based monomer that includes a norbornene ring and one or more rings that are fused with the norbornene ring in the molecule. A compound represented by the following formula (1) or (2) is particularly preferable as the polycyclic norbornene-based monomer from the viewpoint of ensuring that a formed article produced using the resin composition exhibits excellent heat resistance.

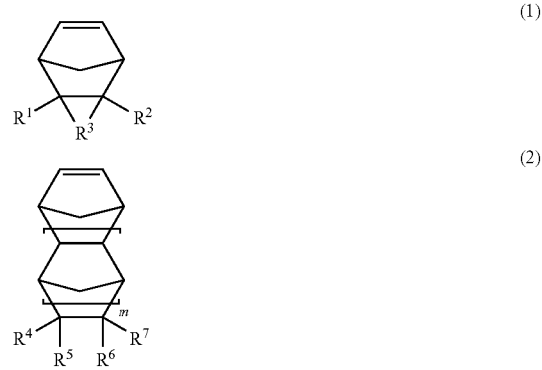

wherein $R^1$, $R^2$, and $R^4$ to $R^7$ are independently a hydrogen atom, a halogen atom, a substituted or unsubstituted hydrocarbon group having 1 to 20 carbon atoms, or a substituent that includes a silicon atom, an oxygen atom, or a nitrogen atom, provided that $R^1$ and $R^2$ and $R^4$ and $R^6$ are optionally bonded to each other to form a ring, $R^3$ is a substituted or unsubstituted divalent hydrocarbon group having 1 to 20 carbon atoms, and m is 1 or 2.

Examples of the halogen atom that may be represented by $R^1$, $R^2$, and $R^4$ to $R^7$ include a fluorine atom, a chlorine atom, a bromine atom, and the like.

Examples of the hydrocarbon group having 1 to 20 carbon atoms (that is substituted or unsubstituted) include an alkyl group such as a methyl group, an ethyl group, a propyl group, an isopropyl group, a butyl group, an isobutyl group, a sec-butyl group, a tert-butyl group, a pentyl group, an isopentyl group, a hexyl group, a heptyl group, an octyl group, a nonyl group, and a decyl group; a cycloalkyl group such as a cyclopropyl group, a cyclobutyl group, a cyclopentyl group, a cyclohexyl group, and a cycloheptyl group; an alkenyl group such as a vinyl group, a 1-propenyl group, an allyl group, a 1-butenyl group, a 2-butenyl group, a pentenyl group, a hexenyl group, and a cyclohexenyl group; an alkynyl group such as an ethynyl group, a 1-propynyl group, a 2-propynyl (propargyl) group, a 3-butynyl group, a pentynyl group, and a hexynyl group; an aryl group such as a phenyl group, a tolyl group, a xylyl group, a biphenylyl group, a 1-naphthyl group, a 2-naphthyl group, an anthryl group, and a phenanthryl group; an aralkyl group such as a benzyl group and a phenethyl group; and the like.

Examples of a substituent that may substitute the hydrocarbon group having 1 to 20 carbon atoms include a halogen atom such as a fluorine atom and a chlorine atom; an alkoxy group such as a methoxy group and an ethoxy group; and the like.

Examples of the divalent hydrocarbon group having 1 to 20 carbon atoms (that is substituted or unsubstituted) represented by $R^3$ include an alkylene group such as a methylene group and an ethylene group; an alkenylene group such as a vinylene group; an alkynylene group such as an ethynylene group; an arylene group such as a phenylene group; a combination thereof; and the like. Examples of a substituent that may substitute the divalent hydrocarbon group having 1 to 20 carbon atoms include those mentioned above in connection with the hydrocarbon group having 1 to 20 carbon atoms that may be represented by $R^1$, $R^2$, and $R^4$ to $R^7$.

Specific examples of the polycyclic norbornene-based monomer represented by the formula (1) include dicyclopentadiene, methyldicyclopentadiene, tricyclo[5.2.1.0$^{2,6}$] dec-8-ene, tetracyclo[9.2.1.0$^{2,10}$.0$^{3,8}$]tetradeca-3,5,7,12-tetraene (also referred to as 1,4-methano-1,4,4a,9a-tetrahydro-9H-fluorene), tetracyclo[10.2.1.0$^{2,11}$.0$^{4,9}$]pentadeca-4,6,8, 13-tetraene (also referred to as 1,4-methano-1,4,4a,9,9a,10-hexahydroanthracene), and the like.

Examples of the polycyclic norbornene-based monomer represented by the formula (2) include tetracyclododecene and derivatives thereof (m=1); and hexacycloheptadecene and derivatives thereof (m=2).

Specific examples of tetracyclododecene and derivatives thereof include unsubstituted tetracyclododecene and a tetracyclododecene derivative that is substituted with an alkyl group, such as tetracyclododecene, 8-methyltetracyclododecene, 8-ethyltetracyclododecene, 8-cyclohexyltetracyclododecene, and 8-cyclopentyltetracyclododecene; a tetracyclododecene derivative that includes a double bond outside the ring, such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene; a tetracyclododecene derivative that is substituted with an aromatic ring, such as 8-phenyltetracyclododecene; a tetracyclododecene derivative that is substituted with a substituent that includes an oxygen atom, such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic anhydride; a tetracyclododecene derivative that is substituted with a substituent that includes a nitrogen atom, such as 8-cyanotetracyclododecene and tetracyclododecene-8,9-dicarboxylic acid imide; a tetracyclododecene derivative that is substituted with a substituent that includes a halogen atom, such as 8-chlorotetracyclododecene; a tetracyclododecene derivative that is substituted with a substituent that includes a silicon atom, such as 8-trimethoxysilyltetracyclododecene; and the like.

Specific examples of hexacycloheptadecene and derivatives thereof include unsubstituted hexacycloheptadecene and a hexacycloheptadecene derivative that is substituted with an alkyl group, such as hexacycloheptadecene, 12-methylhexacycloheptadecene, 12-ethylhexacycloheptadecene, 12-cyclohexylhexacycloheptadecene, and 12-cyclopentylhexacycloheptadecene; a hexacycloheptadecene derivative that includes a double bond outside the ring, such as 12-methylidenehexacycloheptadecene, 12-ethylidenehexacycloheptadecene, 12-vinylhexacycloheptadecene, 12-propenylhexacycloheptadecene, 12-cyclohexenylhexacycloheptadecene, and 12-cyclopentenylhexacycloheptadecene; a hexacycloheptadecene derivative that is substituted with an aromatic ring, such as 12-phenylhexacycloheptadecene; a hexacycloheptadecene derivative that is substituted with a substituent that includes an oxygen atom, such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene-12,13-dicarboxylic acid, and hexacycloheptadecene-12,13-dicarboxylic anhydride; a hexacycloheptadecene derivative that is substituted with a substituent that includes a nitrogen atom, such as 12-cyanohexacycloheptadecene and hexacycloheptadecene-12,13-dicarboxylic acid imide; a hexacycloheptadecene derivative that is substituted with a substituent that includes a halogen atom, such as 12-chlorohexacycloheptadecene; a hexacycloheptadecene derivative that is substituted with a substituent that includes a silicon atom, such as 12-trimethoxysilylhexacycloheptadecene; and the like.

These polycyclic norbornene-based monomers may be used either alone or in combination.

It is preferable to use a polycyclic norbornene-based monomer mixture that includes dicyclopentadiene in a ratio of 50 wt % or more, and more preferable to use dicyclopentadiene alone, from the viewpoint of improving the crystallinity of the hydrogenated cycloolefin ring-opening polymer, and ensuring that the resulting formed article exhibits excellent heat resistance.

The polycyclic norbornene-based monomer may be present in the form of an endo-stereoisomer or an exo-stereoisomer. Both the endo-stereoisomer and the exo-stereoisomer can be used as the monomer. Either the endo-stereoisomer or the exo-stereoisomer may be used alone, or an isomer mixture that includes the endo-stereoisomer and the exo-stereoisomer in an arbitrary ratio may be used. Note that it is preferable to increase the ratio of the endo-stereoisomer or the exo-stereoisomer from the viewpoint of improving the crystallinity of the hydrogenated cycloolefin ring-opening polymer, and obtaining a resin composition that exhibits excellent heat resistance. For example, it is preferable to set the ratio of the endo-stereoisomer or the exo-stereoisomer to 80% or more, more preferably 90% or more, and particularly preferably 95% or more. Note that it is preferable to increase the ratio of the endo-stereoisomer from the viewpoint of ease of synthesis.

The cycloolefin ring-opening polymer may be produced by copolymerizing a monomer other than the polycyclic norbornene-based monomer with the polycyclic norbornene-based monomer as long as a polymer that exhibits crystallinity is obtained. Examples of the monomer that may be copolymerized with the polycyclic norbornene-based monomer include a bicyclic norbornene-based compound that does not include a cyclic structure that is fused with the norbornene skeleton, a monocycloolefin, a cyclic diene, and derivatives thereof.

Specific examples of the bicyclic norbornene-based compound that does not include a cyclic structure that is fused with the norbornene skeleton, include unsubstituted norbornene and a norbornene derivative that is substituted with an alkyl group, such as norbornene, 5-methylnorbornene, 5-ethylnorbornene, 5-butylnorbornene, 5-hexylnorbornene, 5-decylnorbornene, 5-cyclohexylnorbornene, and 5-cyclopentylnorbornene; a norbornene derivative that is substituted with an alkenyl group, such as 5-ethylidenenorbornene, 5-vinylnorbornene, 5-propenylnorbornene, 5-cyclohexenylnorbornene, and 5-cyclopentenylnorbornene; a norbornene derivative that is substituted with an aromatic ring, such as 5-phenylnorbornene; a norbornene derivative that is substituted with a polar group that includes an oxygen atom, such as 5-methoxycarbonylnorbornene, 5-ethoxycarbonylnorbornene, 5-methyl-5-methoxycarbonylnorbornene, 5-methyl-5-ethoxycarbonylnorbornene, norbornenyl-2-methyl propionate, norbornenyl-2-methyl octanate, 5-hydroxymethylnorbornene, 5,6-di(hydroxymethyl)norbornene, 5,5-di(hydroxymethyl)norbornene, 5-hydroxy-i-propylnorbornene, 5,6-dicarboxynorbornene, and 5-methoxycarbonyl-6-carboxynorbornene; a norbornene derivative that is substituted with a polar group that includes a nitrogen atom, such as 5-cyanonorbornene; and the like.

Specific examples of the monocycloolefin include cyclohexene, cycloheptene, and cyclooctene.

Specific examples of the cyclic diene include cyclohexadiene and cycloheptadiene.

It is preferable that the monomer used to produce the cycloolefin ring-opening polymer that is subjected to hydrogenation include the polycyclic norbornene-based monomer in a ratio of 80 wt % or more, and it is more preferable to use substantially only the polycyclic norbornene-based monomer as the monomer used to produce the cycloolefin ring-opening polymer that is subjected to hydrogenation, from the viewpoint of improving the crystallinity of the hydrogenated cycloolefin ring-opening polymer, and ensuring that the resulting formed article exhibits excellent heat resistance.

A hydrogenated cycloolefin ring-opening polymer that has syndiotacticity is obtained by hydrogenating a cycloolefin ring-opening polymer that has syndiotacticity.

Therefore, it is necessary to use a ring-opening polymerization catalyst that can provide the cycloolefin ring-opening polymer with syndiotacticity when subjecting the polycyclic norbornene-based monomer to ring-opening polymerization. The ring-opening polymerization catalyst is not particularly limited as long as the ring-opening polymerization catalyst can provide the cycloolefin ring-opening polymer with syndiotacticity. It is preferable to use a ring-opening polymerization catalyst that includes a metal compound represented by the following formula (3) (hereinafter may be referred to as "metal compound (3)").

$$M(NR^8)X_{4-a}(OR^9)_a \cdot L_b \quad (3)$$

wherein M is a metal atom selected from the Group 6 transition metal atoms in the periodic table, $R^8$ is a phenyl group that is unsubstituted or substituted at at least one of the positions 3, 4, and 5, or a group represented by $CH_2R^{10}$, $R^9$ is a group selected from a substituted or unsubstituted alkyl group and a substituted or unsubstituted aryl group, X is a group selected from a halogen atom, an alkyl group, an aryl group, and an alkylsilyl group, L is a neutral electron donor ligand, a is 0 or 1, b is an integer from 0 to 2, and $R^{10}$ is a hydrogen atom, or a group selected from a substituted or unsubstituted alkyl group and a substituted or unsubstituted aryl group.

The metal atom (M) included in the metal compound (3) is selected from the Group 6 transition metal atoms (chromium, molybdenum, and tungsten) in the periodic table.

Among these, molybdenum and tungsten are preferable, and tungsten is particularly preferable.

The metal compound (3) includes a metal-imide bond. $R^8$ is a substituent that is bonded to the nitrogen atom that forms the metal-imide bond.

Examples of a substituent that may substitute the phenyl group that is unsubstituted or substituted at at least one of the positions 3, 4, and 5, include an alkyl group such as a methyl group and an ethyl group; a halogen atom such as a fluorine atom, a chlorine atom, and a bromine atom; an alkoxy group such as a methoxy group, an ethoxy group, and an isopropoxy group; and the like. Note that substituents that substitute the phenyl group at at least two of the positions 3, 4, and 5 may be bonded to each other.

Specific examples of the phenyl group that is unsubstituted or substituted at at least one of the positions 3, 4, and 5, include a phenyl group; a monosubstituted phenyl group such as a 4-methylphenyl group, a 4-chlorophenyl group, a 3-methoxyphenyl group, a 4-cyclohexylphenyl group, and a 4-methoxyphenyl group; a disubstituted phenyl group such as a 3,5-dimethylphenyl group, a 3,5-dichlorophenyl group, a 3,4-dimethylphenyl group, and a 3,5-dimethoxyphenyl group; a trisubstituted phenyl group such as a 3,4,5-trimethylphenyl group and a 3,4,5-trichlorophenyl group; and a substituted or unsubstituted 2-naphthyl group such as a 2-naphthyl group, a 3-methyl-2-naphthyl group, and a 4-methyl-2-naphthyl group.

The number of carbon atoms of the substituted or unsubstituted alkyl group that may be represented by $R^{10}$ (included in the group represented by $CH_2R^{10}$ (that may be used as the substituent ($R^8$ in the formula (3)) that is bonded to the nitrogen atom included in the metal compound (3))) is not particularly limited. The number of carbon atoms of the substituted or unsubstituted alkyl group is normally 1 to 20, and preferably 1 to 10. The alkyl group may be either linear or branched. Examples of a substituent that may substitute the alkyl group include, but are not limited to, a substituted or unsubstituted phenyl group such as a phenyl group and a 4-methylphenyl group; and an alkoxy group such as a methoxy group and an ethoxy group.

Examples of the substituted or unsubstituted aryl group that may be represented by $R^{10}$ include a phenyl group, a 1-naphthyl group, a 2-naphthyl group, and the like. Examples of a substituent that may substitute the aryl group include, but are not limited to, a substituted or unsubstituted phenyl group such as a phenyl group and a 4-methylphenyl group; an alkoxy group such as a methoxy group and an ethoxy group; and the like.

$R^{10}$ is preferably an alkyl group having 1 to 20 carbon atoms, such as a methyl group, an ethyl group, a propyl group, an isopropyl group, a butyl group, an isobutyl group, a t-butyl group, a pentyl group, a hexyl group, an octyl group, or a decyl group.

The metal compound (3) includes three or four groups selected from a halogen atom, an alkyl group, an aryl group, and an alkylsilyl group. Specifically, X in the formula (3) is a group selected from a halogen atom, an alkyl group, an aryl group, and an alkylsilyl group. Note that the metal compound (3) may have a structure in which two or more groups represented by X are bonded to each other.

Examples of the halogen atom that may be represented by X include a chlorine atom, a bromine atom, and an iodine atom. Examples of the alkyl group include a methyl group, an ethyl group, a propyl group, an isopropyl group, a butyl group, an isobutyl group, a t-butyl group, a pentyl group, a neopentyl group, a benzyl group, a neophyl group, and the like. Examples of the aryl group include a phenyl group, a 4-methylphenyl group, a 2,6-dimethylphenyl group, a 1-naphthyl group, a 2-naphthyl group, and the like. Examples of the alkylsilyl group include a trimethylsilyl group, a triethylsilyl group, a t-butyldimethylsilyl group, and the like.

The metal compound (3) may include one metal-alkoxide bond or one metal-aryloxide bond. The substituent ($R^9$ in the formula (3)) that is bonded to the oxygen atom that forms the metal-alkoxide bond or the metal-aryloxide bond is a group selected from a substituted or unsubstituted alkyl group and a substituted or unsubstituted aryl group. Examples of the substituted or unsubstituted alkyl group and the substituted or unsubstituted aryl group that may be represented by $R^9$ include those mentioned above in connection with $R^{10}$.

The metal compound (3) may include one or two neutral electron donor ligands. Examples of the neutral electron donor ligand (L in the formula (3)) include an electron donor compound that includes an element (atom) among the Groups 14 and 15 elements in the periodic table. Specific examples of the neutral electron donor ligand include a phosphine such as trimethylphosphine, triisopropylphosphine, tricyclohexylphosphine, and triphenylphosphine; an ether such as diethyl ether, dibutyl ether, 1,2-dimethoxyethane, and tetrahydrofuran; an amine such as trimethylamine, triethylamine, pyridine, and lutidine; and the like. Among these, an ether is particularly preferable.

Examples of the metal compound (3) that may particularly preferably be used as the ring-opening polymerization catalyst used to produce a cycloolefin ring-opening polymer that has syndiotacticity, include a tungsten compound that includes a phenylimide group (i.e., a compound represented by the formula (3) wherein M is a tungsten atom, and $R^8$ is a phenyl group). It is particularly preferable to use tetrachlorotungsten phenylimide-(tetrahydrofuran).

The metal compound (3) may be synthesized by mixing an oxyhalogenated product of a Group 6 transition metal, a phenyl isocyanate that is unsubstituted or substituted at at least one of the positions 3, 4, and 5 (or monosubstituted methyl isocyanate), and a neutral electron donor ligand (L) optionally together with an alcohol, a metal alkoxide, or a metal aryloxide (e.g., the method disclosed in JP-A-5-345817), for example. The metal compound (3) thus synthesized may be purified and isolated by crystallization or the like, or the resulting solution may be used directly as the ring-opening polymerization catalyst without purification.

The metal compound (3) (ring-opening polymerization catalyst) is used in such an amount that the molar ratio (metal compound (3):entire monomer) of the metal compound (3) to the entire monomer is normally 1:100 to 1:2,000,000, preferably 1:500 to 1:1,000,000, and more preferably 1:1000 to 1:500,000. If the amount of the catalyst is too large, it may be difficult to remove the catalyst. If the amount of the catalyst is too small, sufficient polymerization activity may not be obtained.

The metal compound (3) may be used alone as the ring-opening polymerization catalyst. Note that it is preferable to use an organometallic reducing agent in combination with the metal compound (3) from the viewpoint of improving the polymerization activity.

Examples of the organometallic reducing agent include a compound that includes an element among the Groups 1, 2, 12, 13, and 14 elements in the periodic table, and a hydrocarbon group having 1 to 20 carbon atoms. An organolithium, an organomagnesium, an organozinc, an organoaluminum, and an organotin are preferable, and an organoaluminum and an organotin are particularly preferable.

Examples of the organolithium include n-butyllithium, methyllithium, phenyllithium, and the like. Examples of the organomagnesium include butylethylmagnesium, butyloctylmagnesium, dihexylmagnesium, ethylmagnesium chloride, n-butylmagnesium chloride, allylmagnesium bromide, and the like. Examples of the organozinc include dimethylzinc, diethylzinc, diphenylzinc, and the like. Examples of the organoaluminum include trimethylaluminum, triethylaluminum, triisobutylaluminum, diethylaluminum chloride, ethylaluminum sesquichloride, ethylaluminum dichloride, diethylaluminum ethoxide, diisobutylaluminum isobutoxide, ethylaluminum diethoxide, isobutylaluminum diisobutoxide, and the like. Examples of the organotin include tetramethyltin, tetra(n-butyl)tin, tetraphenyltin, and the like.

The organometallic reducing agent is preferably used in a 0.1 to 100-fold amount, more preferably a 0.2 to 50-fold amount, and particularly preferably a 0.5 to 20-fold amount (on a molar basis), based on the amount of the metal compound (3). If the amount of the organometallic reducing agent is too small, the polymerization activity may not be improved. If the amount of the organometallic reducing agent is too large, a side reaction may easily occur.

The polymerization reaction for producing the crystalline cycloolefin ring-opening polymer is normally effected in an organic solvent.

The organic solvent is not particularly limited as long as the organic solvent can dissolve or disperse the target ring-opening polymer (or a hydrogenated product thereof) under specific conditions, and does not hinder the polymerization reaction and the hydrogenation reaction.

Specific examples of the organic solvent include an aliphatic hydrocarbon such as pentane, hexane, and heptane; an alicyclic hydrocarbon such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; an aromatic hydrocarbon such as benzene, toluene, and xylene; a halogen-containing aliphatic hydrocarbon such as dichloromethane, chloroform, and 1,2-dichloroethane; a halogen-containing aromatic hydrocarbon such as chlorobenzene and dichlorobenzene; a nitrogen-containing hydrocarbon-based solvent such as nitromethane, nitrobenzene, and acetonitrile; an ether such as diethyl ether and tetrahydrofuran; and a mixed solvent thereof. Among these, an aromatic hydrocarbon, an aliphatic hydrocarbon, an alicyclic hydrocarbon, and an ether are preferable.

The ring-opening polymerization reaction may be initiated by mixing the monomer and the metal compound (3) optionally together with the organometallic reducing agent. These components may be added in an arbitrary order. For example, a mixture of the metal compound (3) and the organometallic reducing agent may be added to the monomer, and the resulting mixture may be mixed, or a mixture of the monomer and the metal compound (3) may be added to the organometallic reducing agent, and the resulting mixture may be mixed, or the metal compound (3) may be added to a mixture of the monomer and the organometallic reducing agent, and the resulting mixture may be mixed.

Each component may be added at one time, or may be added stepwise. Each component may be added continuously over a relatively long time (e.g., 1 minute or more). It is preferable to add the monomer or the metal compound (3) either stepwise or continuously from the viewpoint of controlling the polymerization temperature and the molecular weight of the resulting ring-opening polymer, and obtaining a resin composition that exhibits excellent formability. It is particularly preferable to add the monomer either stepwise or continuously.

The monomer concentration in the organic solvent when effecting the polymerization reaction is not particularly limited, but is preferably 1 to 50 wt %, more preferably 2 to 45 wt %, and particularly preferably 3 to 40 wt %. If the monomer concentration is too low, the polymer productivity may decrease. If the monomer concentration is too high, the viscosity of the polymer solution may increase to a large extent, and it may be difficult to effect the subsequent hydrogenation reaction.

An activity modifier may be added to the polymerization system. The activity modifier may be used to stabilize the ring-opening polymerization catalyst, and adjust the rate of the polymerization reaction and the molecular weight distribution of the polymer. The activity modifier is not particularly limited as long as the activity modifier is an organic compound that includes a functional group. It is preferable to use an oxygen-containing organic compound, a nitrogen-containing organic compound, or a phosphorus-containing organic compound as the activity modifier. Specific examples of the activity modifier include an ether such as diethyl ether, diisopropyl ether, dibutyl ether, anisole, furan, and tetrahydrofuran; a ketone such as acetone, benzophenone, and cyclohexanone; an ester such as ethyl acetate; a nitrile such as acetonitrile and benzonitrile; an amine such as triethylamine, triisopropylamine, quinuclidine, and N,N-diethylaniline; pyridine and derivatives thereof such as pyridine, 2,4-lutidine, 2,6-lutidine, and 2-t-butylpyridine; a phosphine such as triphenylphosphine and tricyclohexylphosphine; a phosphate such as trimethyl phosphate and triphenyl phosphate; a phosphine oxide such as triphenylphosphine oxide; and the like. These activity modifiers may be used either alone or in combination. The activity modifier may be added in an arbitrary amount. The activity modifier is normally added in a ratio of 0.1 to 100 mol % based on the metal compound that is used as the ring-opening polymerization catalyst.

A molecular weight modifier may be added to the polymerization system in order to adjust the molecular weight of the ring-opening polymer. Examples of the molecular weight modifier include an α-olefin such as 1-butene, 1-pentene, 1-hexene, and 1-octene; an aromatic vinyl compound such as styrene and vinyltoluene; an oxygen-containing vinyl compound such as ethyl vinyl ether, isobutyl vinyl ether, allyl glycidyl ether, allyl acetate, allyl alcohol, and glycidyl methacrylate; a halogen-containing vinyl compound such as arylchloride; a nitrogen-containing vinyl compound such as acrylamide; a nonconjugated diene such as 1,4-pentadiene, 1,4-hexadiene, 1,5-hexadiene, 1,6-heptadiene, 2-methyl-1,4-pentadiene, and 2,5-dimethyl-1,5-hexadiene; and a conjugated diene such as 1,3-butadiene, 2-methyl-1,3-butadiene, 2,3-dimethyl-1,3-butadiene, 1,3-pentadiene, and 1,3-hexadiene.

The amount of the molecular weight modifier may be determined taking account of the desired molecular weight. The molecular weight modifier is normally added in a ratio of 0.1 to 50 mol % based on the monomer.

The polymerization temperature is not particularly limited, but is normally −78 to +200° C., and preferably −30 to +180° C. The polymerization time is not particularly limited, and is determined taking account of the reaction scale. The polymerization time is normally 1 minute to 1000 hours.

A cycloolefin ring-opening polymer that has syndiotacticity can be obtained by subjecting the monomer including the polycyclic norbornene-based monomer to ring-opening polymerization under the above conditions using the ring-opening polymerization catalyst that includes the metal compound (3).

The ratio of racemo diads in the cycloolefin ring-opening polymer (that is subjected to hydrogenation) is not particularly limited, but is normally 60% or more, preferably 65% or more, and more preferably 70 to 99%. The ratio of racemo diads (i.e., the degree of syndiotacticity) in the crystalline cycloolefin ring-opening polymer can be adjusted by appropriately selecting the type of the ring-opening polymerization catalyst, for example.

The weight average molecular weight (polyisoprene-equivalent weight average molecular weight) (Mw) of the crystalline cycloolefin ring-opening polymer (that is subjected to hydrogenation) determined by gel permeation chromatography is not particularly limited, but is preferably 10,000 to 100,000, and more preferably 15,000 to 80,000. A hydrogenated crystalline cycloolefin ring-opening polymer produced using the crystalline cycloolefin ring-opening polymer that has a weight average molecular weight within the above range exhibits excellent formability, and can produce a formed article that exhibits excellent heat resistance. The weight average molecular weight of the crystalline cycloolefin ring-opening polymer can be adjusted by adjusting the amount of the molecular weight modifier used during polymerization, for example.

The molecular weight distribution (i.e., the ratio (Mw/Mn) of the polyisoprene-equivalent weight average molecular weight to the polyisoprene-equivalent number average molecular weight determined by gel permeation chromatography) of the crystalline cycloolefin ring-opening polymer (that is subjected to hydrogenation) is not particularly limited, but is preferably 1.5 to 4.0, and more preferably 1.6 to 3.5. A hydrogenated crystalline cycloolefin ring-opening polymer produced using the crystalline cycloolefin ring-opening polymer that has a molecular weight distribution within the above range exhibits excellent formability.

The molecular weight distribution of the hydrogenated crystalline cycloolefin ring-opening polymer can be adjusted by appropriately selecting the monomer addition method and adjusting the monomer concentration when effecting the ring-opening polymerization reaction.

The crystalline cycloolefin ring-opening polymer (i.e., the main-chain double bond of the crystalline cycloolefin ring-opening polymer) may be hydrogenated by supplying hydrogen to the reaction system in the presence of a hydrogenation catalyst. A hydrogenation catalyst that is normally used when hydrogenating an olefin compound may be used as the hydrogenation catalyst. Examples of the hydrogenation catalyst include the following.

Examples of a homogeneous catalyst include a catalyst system that includes a combination of a transition metal compound and an alkali metal compound, such as a combination of cobalt acetate and triethylaluminum, a combination of nickel acetylacetonate and triisobutylaluminum, a combination of titanocene dichloride and n-butyllithium, a combination of zirconocene dichloride and sec-butyllithium, and a combination of tetrabutoxytitanate and dimethyl magnesium. Further examples of the homogeneous catalyst include a noble metal complex catalyst such as dichlorobis(triphenylphosphine)palladium, chlorohydridocarbonyltris(triphenylphosphine)ruthenium, bis(tricyclohexylphosphine)benzylidineruthenium(IV) dichloride, and chlorotris(triphenylphosphine)rhodium.

Examples of an inhomogeneous catalyst include nickel, palladium, platinum, rhodium, and ruthenium, and a solid catalyst in which a metal among these metals is supported on a carrier such as carbon, silica, diatomaceous earth, alumina, or titanium oxide (e.g., nickel/silica, nickel/diatomaceous earth, nickel/alumina, palladium/carbon, palladium/silica, palladium/diatomaceous earth, and palladium/alumina).

The hydrogenation reaction is normally effected in an inert organic solvent. Examples of the inert organic solvent that may be used for the hydrogenation reaction include an aromatic hydrocarbon such as benzene and toluene; an aliphatic hydrocarbon such as pentane and hexane; an alicyclic hydrocarbon such as cyclohexane and decahydronaphthalene; an ether such as tetrahydrofuran and ethylene glycol dimethyl ether; and the like. The inert organic solvent may normally be the same as the solvent used for the polymerization reaction. Specifically, the hydrogenation catalyst may be added directly to the polymer solution, and the hydrogenation reaction may be effected.

The hydrogenation reaction may be effected under different conditions depending on the hydrogenation catalyst. The reaction temperature (hydrogenation temperature) is normally −20 to +250° C., preferably −10 to +220° C., and more preferably 0 to +200° C. If the hydrogenation temperature is too low, the reaction rate (hydrogenation rate) may be too low. If the hydrogenation temperature is too high, a side reaction may occur. The hydrogen pressure is normally 0.01 to 20 MPa, preferably 0.05 to 15 MPa, and more preferably 0.1 to 10 MPa. If the hydrogen pressure is too low, the hydrogenation rate may be too low. If the hydrogen pressure is too high, it may be necessary to use a pressure reactor (i.e., the reaction equipment is limited). The reaction time (hydrogenation time) is not particularly limited as long as the desired hydrogenation ratio can be achieved. The reaction time is normally 0.1 to 10 hours.

The hydrogenation ratio (i.e., the ratio of main-chain double bonds that have been hydrogenated) of the crystalline cycloolefin ring-opening polymer is not particularly limited, but is preferably 70% or more, more preferably 80% or more, particularly preferably 90% or more, and most preferably 99% or more. The heat resistance of the hydrogenated crystalline cycloolefin ring-opening polymer is improved as the hydrogenation ratio increases.

The hydrogenated crystalline cycloolefin ring-opening polymer that is produced as described above includes a repeating unit (represented by the following formula (4) or (5)) derived from a polycyclic norbornene-based monomer that includes three or more rings.

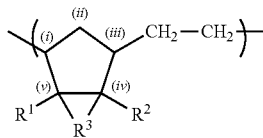

(4)

wherein $R^1$ and $R^2$ are independently a hydrogen atom, a halogen atom, a substituted or unsubstituted hydrocarbon group having 1 to 20 carbon atoms, or a substituent that includes a silicon atom, an oxygen atom, or a nitrogen atom, provided that $R^1$ and $R^2$ are optionally bonded to each other to form a ring, and $R^3$ is a substituted or unsubstituted divalent hydrocarbon group having 1 to 20 carbon atoms.

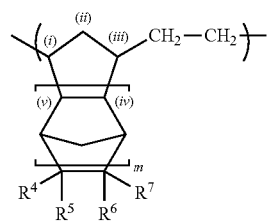

(5)

wherein $R^1$ to $R^7$ and m are the same as defined above.

The hydrogenated crystalline cycloolefin ring-opening polymer that is produced as described above maintains the syndiotacticity of the ring-opening polymer that has been subjected to hydrogenation. Therefore, the resulting hydrogenated crystalline cycloolefin ring-opening polymer has syndiotacticity. The ratio of racemo diads in the hydrogenated crystalline cycloolefin ring-opening polymer used in connection with one embodiment of the invention is not particularly limited as long as the hydrogenated cycloolefin ring-opening polymer has crystallinity, but is normally 55% or more, preferably 60% or more, and more preferably 65 to 99%.

Since the tacticity of a polymer does not change due to a hydrogenation reaction, a hydrogenated crystalline cycloolefin ring-opening polymer that has syndiotacticity and crystallinity and includes a repeating unit derived from the polycyclic norbornene-based monomer can be obtained by hydrogenating the cycloolefin ring-opening polymer that has syndiotacticity.

A resin composition that is prepared using the hydrogenated crystalline cycloolefin ring-opening polymer that has syndiotacticity can produce a formed article that is rarely deformed due to the effects of heat. Note that the ratio of racemo diads in the hydrogenated crystalline cycloolefin ring-opening polymer depends on the ratio of racemo diads in the crystalline cycloolefin ring-opening polymer that is subjected to hydrogenation.

The ratio of racemo diads in the hydrogenated crystalline cycloolefin ring-opening polymer may be quantitatively determined by analyzing the $^{13}$C-NMR spectrum of the hydrogenated crystalline cycloolefin ring-opening polymer. For example, the ratio of racemo diads in a hydrogenated dicyclopentadiene ring-opening polymer may be quantitatively determined by subjecting the hydrogenated dicyclopentadiene ring-opening polymer to $^{13}$C-NMR measurement at 150° C. using o-dichlorobenzene-$d_4$ as a solvent, and calculating the ratio of racemo diads based on the intensity ratio of the signal at 43.35 ppm (attributed to meso diads) to the signal at 43.43 ppm (attributed to racemo diads).

The melting point of the hydrogenated crystalline cycloolefin ring-opening polymer that is used to prepare the resin composition according to one embodiment of the invention is not particularly limited as long as the hydrogenated cycloolefin ring-opening polymer has crystallinity, but is preferably 200° C. or more, and more preferably 230 to 290° C. A resin composition that exhibits formability and heat resistance in a well-balanced manner can be obtained by utilizing the hydrogenated crystalline cycloolefin ring-opening polymer that has a melting point within the above range. The melting point of the hydrogenated crystalline cycloolefin ring-opening polymer can be adjusted by adjusting the degree of syndiotacticity (i.e., the ratio of racemo diads) of the hydrogenated crystalline cycloolefin ring-opening polymer, or appropriately selecting the type of the monomer, for example.

Hydrogenated Modified Crystalline Cycloolefin Ring-Opening Polymer

The hydrogenated modified crystalline cycloolefin ring-opening polymer used in connection with one embodiment of the invention is obtained by subjecting the hydrogenated crystalline cycloolefin ring-opening polymer to graft modification using an unsaturated carboxylic acid or a silicone derivative.

The hydrogenated modified crystalline cycloolefin ring-opening polymer is provided with a polar group through the graft modification. The term "polar group" used herein refers to a functional group that has polarity. Whether or not the hydrogenated modified crystalline cycloolefin ring-opening polymer includes a polar group may be determined by transmission FT-IR. For example, when maleic anhydride has been introduced into the hydrogenated crystalline cycloolefin ring-opening polymer, an absorption band attributed to a C=O group is observed at 1790 $cm^{-1}$ in the FT-IR spectrum. When vinyltrimethoxysilane has been introduced into the hydrogenated crystalline cycloolefin ring-opening polymer, an absorption band attributed to an Si—$OCH_3$ group is observed at 825 $cm^{-1}$ and 739 $cm^{-1}$ in the FT-IR spectrum.

The unsaturated carboxylic acid used for the graft modification may be an unsaturated carboxylic acid or an unsaturated carboxylic acid derivative. The unsaturated carboxylic acid is not particularly limited as long as the unsaturated carboxylic acid can undergo graft polymerization with the hydrogenated crystalline cycloolefin ring-opening polymer in the presence of a radical initiator (e.g., organic peroxide) (described later) to introduce a polar group into the hydrogenated crystalline cycloolefin ring-opening polymer. Examples of the unsaturated carboxylic acid include acrylic acid, maleic acid, fumaric acid, tetrahydrophtal acid, itaconic acid, citraconic acid, crotonic acid, isocrotonic acid, and nadic acid (endo-cis-bicyclo[2,2,1]hept-5-ene-2,3-dicarboxylic acid). Examples of the unsaturated carboxylic acid derivative include an unsaturated carboxylic anhydride, an unsaturated carboxylic halide, an unsaturated carboxylic acid amide, an unsaturated carboxylic acid imide, an ester compound of an unsaturated carboxylic acid, and the like. Specific examples of the unsaturated carboxylic acid derivative include malenyl chloride, maleimide, maleic anhydride, citraconic anhydride, monomethyl maleate, dimethyl maleate, glycidyl maleate, and the like. Among these, an unsaturated dicarboxylic acid or an unsaturated dicarboxylic anhydride are preferable, and maleic anhydride is particularly preferable, since the advantageous effects of the invention can be more easily achieved. These unsaturated dicarboxylic acids may be used either alone or in combination.

The unsaturated dicarboxylic acid is normally used in an amount of 0.01 to 100 parts by weight, preferably 0.1 to 80 parts by weight, and more preferably 0.5 to 50 parts by weight, based on 100 parts by weight of the hydrogenated crystalline cycloolefin ring-opening polymer. If the amount of the unsaturated dicarboxylic acid is too small, a sufficient amount of the unsaturated dicarboxylic acid may not be introduced into the hydrogenated crystalline cycloolefin ring-opening polymer, and an improvement in mechanical properties may not be achieved. If the amount of the unsaturated dicarboxylic acid is too large, a deterioration in electrical properties may occur.

The silicone derivative used for the graft modification may be an ethylenically unsaturated silane compound. The silicone derivative is not particularly limited as long as the silicone derivative can undergo graft polymerization with the hydrogenated crystalline cycloolefin ring-opening polymer in the presence of an organic peroxide (described later) to introduce a polar group into the hydrogenated crystalline cycloolefin ring-opening polymer. Examples of the ethylenically unsaturated silane compound include an alkoxysilane that includes a vinyl group, such as vinyltrimethoxysilane, vinyltriethoxysilane, dimethoxymethylvinylsilane, and diethoxymethylvinylsilane; an alkoxysilane that includes an allyl group, such as allyltrimethoxysilane and allyltriethoxysilane; an alkoxysilane that includes a p-styryl group, such as p-styryltrimethoxysilane and p-styryltriethoxysilane; an alkoxysilane that includes a 3-methacryloxypropyl group, such as 1,3-methacryloxypropyltrimethoxysilane, 3-methacryloxypropylmethyldimethoxysilane, 3-methacryloxypropyltriethoxysilane, and 3-methacryloxypropylmethyldiethoxysilane; an alkoxysilane that includes a 3-acryloxypropyl group, such as 1,3-acryloxypropyltrimethoxysilane and 3-acryloxypropyltriethoxysilane; an alkoxysilane that includes a 2-norbornen-5-yl group, such as 1,2-norbornen-5-yltrimethoxysilane; and the like. Among these, vinyltrimethoxysilane, vinyltriethoxysilane, dimethoxymethylvinylsilane, diethoxymethylvinylsilane, allyltrimethoxysilane, allyltriethoxysilane, and p-styryltrimethoxysilane are preferable, since the advantageous effects of the invention can be more easily achieved. These ethylenically unsaturated silane compounds may be used either alone or in combination.

The silicone derivative is normally used in an amount of 0.01 to 100 parts by weight, preferably 0.1 to 80 parts by weight, and more preferably 0.5 to 50 parts by weight, based on 100 parts by weight of the hydrogenated crystalline cycloolefin ring-opening polymer. If the amount of the silicone derivative is too small, a sufficient amount of the silicone derivative may not be introduced into the hydrogenated crystalline cycloolefin ring-opening polymer, and an improvement in mechanical properties may not be achieved. If the amount of the silicone derivative is too large, a deterioration in electrical properties may occur.

The graft modification may be effected using an arbitrary method. For example, the graft modification may be effected using a known method such as the method disclosed in JP-A-9-118811 or JP-A-8-020692. It is preferable to effect the graft modification in the presence of a radical initiator from the viewpoint of productivity. The radical initiator used in connection with one embodiment of the invention is not particularly limited as long as the radical initiator functions as a radical reaction initiator. Examples of the radical initiator include an organic peroxide such as dibenzoyl peroxide, t-butyl peroxyacetate, 2,2-di-(t-butylperoxy)butane, t-butyl peroxybenzoate, t-butylcumyl peroxide, dicumyl peroxide, di-t-hexyl peroxide, 2,5-dimethyl-2,5-di(t-butylperoxy)hexane, di-t-butyl peroxide, 2,5-dimethyl-2,5-di(t-butylperoxy)hexane-3, t-butyl hydroperoxide, t-butyl peroxyisobutyrate, lauroyl peroxide, dipropionyl peroxide, and p-menthane hydroperoxide. It is preferable to use a compound that has a one-minute half-life temperature of 170 to 190° C. as the radical initiator. Specifically, it is preferable to use t-butylcumyl peroxide, dicumyl peroxide, di-t-hexyl peroxide, 2,5-dimethyl-2,5-di(t-butylperoxy)hexane, di-t-butyl peroxide, or the like as the radical initiator. These radical initiators may be used either alone or in combination.

The radical initiator is normally used in an amount of 0.01 to 5 parts by weight, preferably 0.05 to 3 parts by weight, and more preferably 0.1 to 2 parts by weight, based on 100 parts by weight of the hydrogenated crystalline cycloolefin ring-opening polymer. If the amount of the radical initiator is too small, the hydrogenated crystalline cycloolefin ring-opening polymer may not be sufficiently graft-modified, and an improvement in mechanical properties may not be achieved. If the amount of the radical initiator is too large, a deterioration in workability may occur.

The total amount of unsaturated carboxylic acid, unsaturated carboxylic anhydride, or silicone derivative introduced into the hydrogenated crystalline cycloolefin ring-opening polymer through the graft modification (i.e., graft modification ratio) (in the entire resin composition according to one embodiment of the invention) is preferably 0.00001 to 50 parts by weight, more preferably 0.00005 to 10 parts by weight, and particularly preferably 0.0001 to 1 part by weight, based on 100 parts by weight of the hydrogenated crystalline cycloolefin ring-opening polymer. If the graft modification ratio is too low, an improvement in mechanical properties may not be achieved. If the graft modification ratio is too high, the modification cost may increase, and the production efficiency and the electrical properties may deteriorate.

Note that the graft modification ratio is calculated using the FT-IR spectrum.

Glass Fibers

The glass fibers included in the resin composition according to one embodiment of the invention may be in the form of chopped strands, cut fibers, milled fibers, filaments, cloth, staple yarns, or the like.

The average fiber diameter of the glass fibers included in the resin composition according to one embodiment of the invention is preferably 1 to 30 μm, and more preferably 5 to 15 μm, from the viewpoint of ease of mixing with the resin, dispersibility, and the fiber reinforcement effect. The average fiber length of the glass fibers included in the resin composition according to one embodiment of the invention is preferably 1 to 10 mm, and more preferably 2 to 5 mm, from the viewpoint of ease of mixing with the resin, dispersibility, and the fiber reinforcement effect. If the average fiber diameter of the glass fibers is less than 1 μm, the glass fibers may easily aggregate, and exhibit insufficient dispersibility. If the average fiber diameter of the glass fibers exceeds 30 μm, the aspect ratio (L/D) may decrease, and the fiber reinforcement effect may deteriorate. If the average fiber length of the glass fibers is less than 1 mm, the fiber reinforcement effect may deteriorate. If the average fiber length of the glass fibers exceeds 10 mm, a problem may occur when using an injection molding method or the like that melt-forms the resin composition. Note that the average fiber length of the glass fibers may exceed 10 mm when using a compression molding method since it is possible to mold (form) a resin composition in which a fibrous inorganic filler (e.g., long glass fibers or glass cloth) is added to the hydrogenated modified block copolymer [3].

The resin composition according to one embodiment of the invention includes the glass fibers in an amount of 5 to 150 parts by weight, preferably 7 to 130 parts by weight, and more preferably 10 to 100 parts by weight, based on 100 parts by weight of the resin component (see above). If the amount of the glass fibers is too small, an improvement in mechanical properties may not be achieved. If the amount of the glass fibers is too large, a deterioration in electrical properties may occur.

The resin composition according to one embodiment of the invention may be prepared by mixing the hydrogenated crystalline cycloolefin ring-opening polymer, the hydrogenated modified crystalline cycloolefin ring-opening polymer, the glass fibers, and an optional additional component (described later) using a normal method. The mixing method is not particularly limited. For example, the components may be melt-mixed (melt-kneaded) using a single-screw kneader, a twin-screw kneader, or the like, or may be dry-blended using a mixer or the like.

The resin composition according to one embodiment of the invention thus prepared exhibits reflow resistance, has a low dielectric loss tangent in a high-frequency region, and exhibits excellent mechanical strength (e.g., bending strength). The bending strength of the resin composition according to one embodiment of the invention is preferably 170 MPa or more, and more preferably 180 MPa or more. The dielectric loss tangent (at 1 GHz) of the resin composition according to one embodiment of the invention is preferably 0.002 or less, and more preferably 0.001 or less.

Additional Component

Examples of the additional component that may be added to the resin composition according to one embodiment of the invention include an antioxidant such as a phenol-based antioxidant, a phosphorus-based antioxidant, and a sulfur-based antioxidant; a light stabilizer such as a hindered amine-based light stabilizer; wax such as petroleum-based wax, Fischer-Tropsch wax, and polyalkylene wax; a nucleator such as a sorbitol-based compound, a metal salt of an organophosphoric acid, a metal salt of an organic carboxylic acid, kaolin, and talc; a fluorescent whitening agent such as a diaminostilbene derivative, a coumarin derivative, an azole-based derivative (e.g., benzoxazole derivative, benzotriazole derivative, benzimidazole derivative, and benzothiazole derivative), a carbazole derivative, a pyridine derivative, a naphthalic acid derivative, and an imidazolone derivative; a UV absorber such as a benzophenone-based UV absorber, a salicylate-based UV absorber, and a benzotriazole-based UV absorber; an inorganic filler such as talc, silica, and calcium carbonate; a colorant; a flame retardant; a flame retardant promoter; an antistatic agent; a plasticizer; a near-infrared absorber; a lubricant; a polymer material other than the hydrogenated crystalline cycloolefin ring-opening polymer, such as a soft polymer; and the like.

The additional components may be added as long as the properties of the resin composition according to one embodiment of the invention are not impaired.

2) Formed Article

A resin formed article according to one embodiment of the invention may be produced using an arbitrary method. The resin formed article according to one embodiment of the invention may be produced using a known forming (molding) method. Examples of the forming (molding) method include an injection molding method, an extrusion molding method, a press molding method, an inflation molding method, a blow molding method, a calendering method, a cast molding method, a compression molding method, a stretch molding method, and the like. The forming (molding) method may be selected taking account of the desired shape and the like. It is preferable to apply an injection molding method that is suitable for mass production since the resin composition according to one embodiment of the invention exhibits excellent formability (melt-formability).

Examples of the formed article include an electronic part such as a connector, a relay, a condenser, a sensor, an antenna, an IC tray, a chassis, a coil sealing member, a motor case, and a power supply box; an LED optical reflector; a vehicular lamp reflector; an automotive part such as an automotive motor case, a sensor case, and a module part case; an optical lens barrel; a flexible printed circuit board; a printed circuit board release film; a solar cell substrate; a home appliance part for a microwave oven, a rice cooker, an electric thermo pot, a washer-drier, a dishwasher, and an air conditioner; a packaging/packing film; a food sheet/tray; an LED molding material; a housing part such as a pump casing, an impeller, a pipe joint, and a bathroom panel; and the like. In particular, the formed article is suitable as an electronic part.

EXAMPLES

The invention is further described below by way of examples and comparative examples. Note that the units "parts" and "%" used in the examples and the comparative examples respectively refer to "parts by weight" and "wt %" unless otherwise indicated.

The measurement methods and the evaluation methods used in the examples and the comparative examples are described below.

(1) Molecular Weight (Weight Average Molecular Weight and Number Average Molecular Weight) of Crystalline Cycloolefin Ring-Opening Polymer The molecular weight (weight average molecular weight and number average molecular weight) of the crystalline cycloolefin ring-opening polymer was determined as a polystyrene-equivalent value using a gel permeation chromatography (GPC) system ("HLC-8220" manufactured by Tosoh Corporation) and an H-type column (manufactured by Tosoh Corporation) (solvent: tetrahydrofuran, measurement temperature: 40° C.).

(2) Hydrogenation Ratio of Hydrogenated Crystalline Cycloolefin Ring-Opening Polymer The hydrogenation ratio of the hydrogenated crystalline cycloolefin ring-opening polymer was determined by $^1$H-NMR measurement.

(3) Melting Point of Hydrogenated Crystalline Cycloolefin Ring-Opening Polymer

The melting point of the hydrogenated crystalline cycloolefin ring-opening polymer was measured using a differential scanning calorimeter at a heating rate of 10° C./min.

(4) Ratio of Racemo Diads in Hydrogenated Crystalline Cycloolefin Ring-Opening Polymer The ratio of racemo diads in the hydrogenated crystalline cycloolefin ring-opening polymer was determined by subjecting the hydrogenated crystalline cycloolefin ring-opening polymer to $^{13}$C-NMR measurement at 150° C. using o-dichlorobenzene-$d_4$ as a solvent, and calculating the ratio of racemo diads based on the intensity ratio of the signal at 43.35 ppm (attributed to meso diads) to the signal at 43.43 ppm (attributed to racemo diads).

(5) Amount of Polar Groups Introduced into Hydrogenated Crystalline Cycloolefin Ring-Opening Polymer (Graft Modification Ratio)

Whether or not the hydrogenated modified crystalline cycloolefin ring-opening polymer includes a polar group may be determined by transmission FT-IR. For example, when maleic anhydride has been introduced into the hydrogenated crystalline cycloolefin ring-opening polymer, an absorption band attributed to a C=O group is observed at 1790 cm$^{-1}$ in the FT-IR spectrum. When vinyltrimethoxysilane has been introduced into the hydrogenated crystalline cycloolefin ring-opening polymer, an absorption band attributed to an Si=OCH$_3$ group is observed at 825 cm$^{-1}$ and 739 cm$^{-1}$ in the FT-IR spectrum. The amount of polar groups introduced into the hydrogenated crystalline cycloolefin ring-opening polymer can also be quantitatively determined by FT-IR. The amount of polar groups introduced into the hydrogenated crystalline cycloolefin ring-opening polymer was determined by calculating the ratio of the peak height of the absorption band attributed to each polar group to the peak height at 920 cm$^{-1}$ attributed to the hydrogenated crystalline cycloolefin ring-opening polymer, and calculating the amount of polar groups introduced into the hydrogenated crystalline cycloolefin ring-opening polymer using a calibration curve provided in advance.

A specimen was prepared by pressing 0.2 g of pellets of the hydrogenated modified crystalline cycloolefin ring-opening polymer using a vacuum heating press ("11FA" manufactured by Imoto machinery Co., Ltd.) (temperature: 290° C., pressure: 50 MPa, pressing time: 5 minutes) to form a thin film having a thickness of about 30 μm. Whether or not the hydrogenated modified crystalline cycloolefin ring-opening polymer included a polar group was determined, and the amount of polar groups introduced into the hydrogenated crystalline cycloolefin ring-opening polymer was quantitatively determined using an FT-IR spectrometer ("AVATAR 360" manufactured by Thermo Fisher Scientific, Inc.). The integration count was set to 16.

(6) Reflow Resistance of Resin Composition

The reflow resistance of the resin composition was evaluated by heating the specimen at 260° C. for 10 seconds (three times) using an oven, and observing the specimen with the naked eye. A case where the specimen was neither deformed nor melted due to heating was evaluated as "Acceptable", and a case where the specimen was deformed and melted due to heating was evaluated as "Unacceptable".

(7) Dielectric Loss Tangent of Resin Composition

The dielectric constant and the dielectric loss tangent of the resin composition were measured using a network analyzer ("N5230A" manufactured by Agilent Technologies) in accordance with ASTM D2520 (cylindrical cavity resonator method). The measurement frequency was set to 1 GHz.

(8) Bending Strength of Resin Composition

The resin composition was subjected to a bending test in accordance with JIS K 7171 (test speed: 2 mm/min) using an autograph ("AGS-5kNJ•TCR2" manufactured by Shimadzu Corporation) to measure the bending strength of the resin composition.

Synthesis Example

Synthesis of Hydrogenated Crystalline Cycloolefin Ring-Opening Polymer

A high-pressure reaction vessel made of glass (which had been sufficiently dried, and in which the internal atmosphere had been replaced by nitrogen) was charged with 40 parts of a 75% cyclohexane solution of dicyclopentadiene (endo-isomer content: 99% or more) (amount of dicyclopentadiene: 30 parts). After the addition of 738 parts of cyclohexane and 2.0 parts of 1-hexene, the mixture was heated to 50° C. Separately, 4.6 parts of an n-hexane solution of diethylaluminum ethoxide (19 wt %) was added to a solution prepared by dissolving 1.1 parts of tetrachlorotungsten phenylimide-(tetrahydrofuran) complex in 56 parts of toluene, and the mixture was stirred for 10 minutes to prepare a catalyst solution. The catalyst solution was added to the reaction vessel to initiate a ring-opening polymerization reaction. After the addition of 40 parts of a 75% cyclohexane solution of dicyclopentadiene nine times (every 5 minutes) while maintaining the temperature of the mixture at 50° C., the mixture was reacted for 2 hours. After the addition of a small quantity of isopropanol to terminate the polymerization reaction, the polymer solution was poured into a large quantity of isopropanol to coagulate the ring-opening polymer.

The ring-opening polymer thus coagulated was filtered off. The ring-opening polymer was then dried at 40° C. for 20 hours under reduced pressure. The yield of the polymer was 296 parts (yield: 99%). The number average molecular weight (Mn) and the weight average molecular weight (Mw) of the polymer were respectively 14,200 and 27,000, and the molecular weight distribution (Mw/Mn) calculated from the number average molecular weight (Mn) and the weight average molecular weight (Mw) was 1.90.

A high-pressure reaction vessel was charged with 60 parts of the ring-opening polymer and 261 parts of cyclohexane, and the mixture was stirred to dissolve the ring-opening polymer in cyclohexane. After the addition of a hydrogenation catalyst solution prepared by dissolving 0.039 parts of chlorohydridocarbonyltris(triphenylphosphine)ruthenium to 40 parts of toluene, the ring-opening polymer was hydrogenated at 160° C. for 5 hours under a hydrogen pressure of 4 MPa. The resulting reaction mixture was poured into a large quantity of isopropyl alcohol to completely precipitate the polymer, which was filtered off, washed, and dried under reduced pressure at 60° C. for 24 hours to obtain a hydrogenated crystalline cycloolefin ring-opening polymer.

The hydrogenation ratio of the hydrogenated crystalline cycloolefin ring-opening polymer was 99% or more, and the ratio of racemo diads in the hydrogenated crystalline cycloolefin ring-opening polymer was 80%. The melting point of the hydrogenated crystalline cycloolefin ring-opening polymer was 265° C.

Synthesis of Hydrogenated Modified Crystalline Cycloolefin Ring-Opening Polymer a 2.0 parts of maleic anhydride ("CRYSTAL MAN (registered trademark)" manufactured by NOF Corporation) and 0.2 parts of 2,5-dimethyl-2,5-di(t-butylperoxy)hexane ("PERHEXA (registered trademark) 25B" manufactured by NOF Corporation) were added to 100 parts of pellets of the hydrogenated crystalline cycloolefin ring-opening polymer. The mixture was kneaded using a twin-screw extruder ("TEM35B" manufactured by Toshiba Machine Co., Ltd.) (resin temperature: 270° C., screw rotational speed: 100 rpm, residence time: 60 to 70 seconds), and extruded in the shape of a strand. The extruded product was cooled with water, and cut using a pelletizer to obtain 97 parts of pellets of a hydrogenated modified crystalline cycloolefin ring-opening polymer A into which maleic anhydride was introduced ("Modified polymer A" in Table 1).

An absorption band attributed to a C=O group was observed in the FT-IR spectrum of the hydrogenated crystalline cycloolefin ring-opening polymer A (into which maleic anhydride was introduced). The amount of maleic anhydride introduced into the hydrogenated crystalline cycloolefin ring-opening polymer was 1.1 parts.

Synthesis of Hydrogenated Modified Crystalline Cycloolefin Ring-Opening Polymer B 2.0 parts of vinyltrimethoxysilane and 0.2 parts of 2,5-dimethyl-2,5-di(t-butylperoxy)hexane ("PERHEXA (registered trademark) 25B" manufactured by NOF Corporation) were added to 100 parts of pellets of the hydrogenated crystalline cycloolefin ring-opening polymer. The mixture was kneaded using a twin-screw extruder ("TEM35B" manufactured by Toshiba Machine Co., Ltd.) (resin temperature: 270° C., screw rotational speed: 100 rpm, residence time: 60 to 70 seconds), and extruded in the shape of a strand. The extruded product was air-cooled, and cut using a pelletizer to obtain 97 parts of pellets of a hydrogenated modified crystalline cycloolefin ring-opening polymer B into which an alkoxysilyl group was introduced ("Modified polymer B" in Table 1).

An absorption band attributed to an Si—$OCH_3$ group and an Si—$CH_2$ group was observed in the FT-IR spectrum of the hydrogenated crystalline cycloolefin ring-opening polymer B (into which an alkoxysilyl group was introduced). The amount of vinyltrimethoxysilane introduced into the hydrogenated crystalline cycloolefin ring-opening polymer was 1.5 parts based on 100 parts of the hydrogenated crystalline cycloolefin ring-opening polymer.

Example 1

97 parts of the hydrogenated crystalline cycloolefin ring-opening polymer, 3 parts of the hydrogenated modified crystalline cycloolefin ring-opening polymer A, 100 parts of glass fibers ("CS 3PE-960" manufactured by Nitto Boseki Co., Ltd., fiber length: 3 mm, fiber diameter: 13 μm), and 0.8 parts of an antioxidant (tetrakis[methylene-3-(3',5'-di-tert-butyl-4'-hydroxyphenyl)propionate]methane ("Irganox (registered trademark) 1010" manufactured by BASF Japan Ltd.)) were mixed, and the mixture was kneaded using a twin-screw extruder ("TEM35B" manufactured by Toshiba Machine Co., Ltd.) (resin temperature: 270° C., residence time: 30 seconds), and extruded in the shape of a strand. The extruded product was cooled with water, and cut using a pelletizer to obtain pellets. The pellets were molded using a vertical injection molding machine ("SAV-30-30-P" manufactured by Sanjo Seiki Co., Ltd.) (molding temperature: 290° C., mold temperature: 150° C.) to obtain a specimen used for each test. A tabular sheet (length: 70 mm, width: 30 mm, thickness: 1.0 mm) was used for the reflow resistance test. The tabular sheet used for the reflow resistance test was cut to have a width of 1.0 mm (in the longitudinal direction), and used to measure the dielectric loss tangent. A bending specimen in accordance with JIS K 7171 was used for the bending test. Table 1 shows the details of the composition and the evaluation results.

Examples 2 to 8 and Comparative Examples 1 to 5

A formed article was produced in the same manner as in Example 1, and evaluated as described above, except that the amount (parts by weight) of each component was changed as shown in Table 1. The evaluation results are shown in Table 1. In Table 1, "Glass beads" refers to borosilicate glass having a particle size of about 45 μm ("UNIBEADS (registered trademark) UB-02E" manufactured by Unitika Ltd.).

TABLE 1

| | | Composition | | | | | Evaluation results | | |
|---|---|---|---|---|---|---|---|---|---|
| | | Hydrogenated crystalline cycloolefin ring-opening polymer % | Modified polymer A % | Modified polymer B % | Glass fibers Parts | Glass beads Parts | Reflow resistance | Dielectric loss tangent | Bending strength MPa |
| Example | 1 | 97 | 3 | | 100 | | Acceptable | 0.001 | 221 |
| | 2 | 97 | 3 | | 45 | | Acceptable | <0.001 | 202 |
| | 3 | 97 | 3 | | 10 | | Acceptable | <0.001 | 185 |
| | 4 | 90 | 10 | | 45 | | Acceptable | <0.001 | 210 |
| | 5 | 80 | 20 | | 45 | | Acceptable | <0.001 | 212 |
| | 6 | 50 | 50 | | 45 | | Acceptable | <0.001 | 205 |
| | 7 | 0 | 100 | | 45 | | Acceptable | <0.001 | 186 |
| | 8 | 97 | | 3 | 45 | | Acceptable | <0.001 | 205 |
| Comparative Example | 1 | 97 | 3 | | 3 | | Acceptable | <0.001 | 145 |
| | 2 | 97 | 3 | | 240 | | Acceptable | 0.003 | 237 |
| | 3 | 100 | | | 45 | | Acceptable | <0.001 | 159 |
| | 4 | 99.5 | 0.5 | | 45 | | Acceptable | <0.001 | 161 |
| | 5 | 97 | 3 | | | 45 | Unacceptable | <0.001 | 162 |

As is clear from the results shown in Table 1, the resin compositions of Examples 1 to 8 (i.e., the resin compositions according to the invention) exhibited reflow resistance, had a low dielectric loss tangent, and exhibited high bending strength.

A significant decrease in bending strength occurred when the amount of the glass fibers was small, and a significant increase in dielectric loss tangent occurred when the amount of the glass fibers was large (see Comparative Examples 1 and 2).

A significant decrease in bending strength occurred when the hydrogenated modified crystalline cycloolefin ring-opening polymer was not used and/or was used in a small amount (see Comparative Examples 3 and 4).

A resin composition that exhibits reflow resistance could not be obtained, and a significant decrease in bending strength occurred when the glass beads were used instead of the glass fibers (see Example 2 and Comparative Example 5).

The invention claimed is:

1. A resin composition comprising a resin component and glass fibers, the resin component comprising 0 to 99 wt % of a hydrogenated crystalline cycloolefin ring-opening polymer that comprises a repeating unit derived from a polycyclic norbornene-based monomer that includes three or more rings, does not comprise a polar group, and has syndiotacticity, and 1 to 100 wt % of a hydrogenated modified crystalline cycloolefin ring-opening polymer that comprises a repeating unit derived from a polycyclic norbornene-based monomer that includes three or more rings, and comprises a polar group, the resin composition comprising the glass fibers in an amount of 5 to 150 parts by weight based on 100 parts by weight of the resin component.

2. The resin composition according to claim 1, wherein the hydrogenated modified crystalline cycloolefin ring-opening polymer that comprises a repeating unit derived from a polycyclic norbornene-based monomer that includes three or more rings, and comprises a polar group, is a polymer produced by subjecting a hydrogenated crystalline cycloolefin ring-opening polymer that comprises a repeating unit derived from a polycyclic norbornene-based monomer that includes three or more rings, and does not comprise a polar group, to graft modification using an unsaturated carboxylic acid or a silicone derivative.

3. A resin formed article obtained by forming the resin composition according to claim 1.

4. The resin formed article according to claim 3, the resin formed article being an electronic part.

5. A resin formed article obtained by forming the resin composition according to claim 2.

6. The resin formed article according to claim 5, the resin formed article being an electronic part.

7. The resin composition according to claim 1, wherein the resin component comprises 50 to 97 wt % of the hydrogenated crystalline cycloolefin ring-opening polymer and 3 to 50 wt % of the hydrogenated modified crystalline cycloolefin ring-opening polymer.

8. The resin composition according to claim 1, comprising the glass fibers in an amount of 30 to 90 parts by weight based on 100 parts by weight of the resin component.

9. The resin composition according to claim 1, which is a mixture of the resin component and the glass fibers.

10. The resin composition according to claim 1, having a dielectric loss tangent at 1 GHz of 0.002 or less, and a bending strength of 170 MPa or higher.

11. The resin composition according to claim 1, having a dielectric loss tangent at 1 GHz of 0.001 or less, and a bending strength of 180 MPa or higher.

12. The resin composition according to claim 1, wherein the hydrogenated modified crystalline cycloolefin ring-opening polymer has syndiotacticity.

13. The resin composition according to claim 2, wherein the graft modification is carried out using a silicone derivative.

* * * * *